(12) United States Patent
Fukushima

(10) Patent No.: US 7,199,963 B2
(45) Date of Patent: Apr. 3, 2007

(54) METHOD OF PERFORMING SELF-SERVO WRITE USING A HELIUM ENVIRONMENT

(75) Inventor: Craig Fukushima, Monte Sereno, CA (US)

(73) Assignee: Hitachi Global Storage Technologies, B.V., Amsterdam (NL)

( * ) Notice: Subject to any disclaimer, the term of this patent is extended or adjusted under 35 U.S.C. 154(b) by 0 days.

(21) Appl. No.: 10/928,074

(22) Filed: Aug. 27, 2004

(65) Prior Publication Data

US 2006/0044666 A1 Mar. 2, 2006

(51) Int. Cl.
 *G11B 21/02* (2006.01)

(52) U.S. Cl. ................................. 360/75; 360/97.02

(58) Field of Classification Search ................ None
 See application file for complete search history.

(56) References Cited

U.S. PATENT DOCUMENTS

| | | | |
|---|---|---|---|
| 5,243,479 A * | 9/1993 | Nakagoshi et al. ...... 360/98.01 |
| 5,448,429 A | 9/1995 | Cribbs et al. |
| 5,454,157 A | 10/1995 | Ananth et al. |
| 5,570,247 A | 10/1996 | Brown et al. |
| 6,144,178 A * | 11/2000 | Hirano et al. ................ 318/476 |
| 6,178,059 B1 | 1/2001 | Frees |
| 6,633,451 B1 | 10/2003 | Chainer et al. |
| 6,646,821 B2 | 11/2003 | Bernett et al. |
| 6,683,747 B2 | 1/2004 | Bernett |
| 6,898,043 B2 * | 5/2005 | Fioravanti ..................... 360/75 |
| 2002/0011834 A1 * | 1/2002 | Fioravanti .................... 324/149 |
| 2003/0026033 A1 | 2/2003 | Fioravanti et al. |
| 2003/0081344 A1 * | 5/2003 | Fioravanti et al. ............. 360/75 |
| 2003/0179489 A1 * | 9/2003 | Bernett et al. ........... 360/97.01 |
| 2003/0214748 A1 * | 11/2003 | Fioravanti .................... 360/75 |
| 2004/0021980 A1 | 2/2004 | Albrecht et al. |
| 2004/0136114 A1 * | 7/2004 | Toffle et al. ............. 360/99.08 |
| 2005/0128628 A1 * | 6/2005 | Han et al. ..................... 360/75 |

FOREIGN PATENT DOCUMENTS

| | | |
|---|---|---|
| JP | 62137790 | 6/1987 |
| JP | 1092986 | 4/1989 |
| JP | 8111017 | 4/1996 |
| WO | WO 03/001514 A13 | 1/2003 |

* cited by examiner

*Primary Examiner*—Andrew L. Sniezek

(57) ABSTRACT

Methods of performing self-servo write using a helium environment are provided. In one embodiment, a recording disk is placed in an enclosure. The enclosure is filled with a gas that is substantially helium. Self-servo write is used to write circular track positioning information on the recording disk.

18 Claims, 5 Drawing Sheets

METHOD OF PERFORMING SELF-SERVO WRITE USING A HELIUM ENVIRONMENT

RELATED APPLICATIONS

This Application is related to U.S. patent application Ser. No. 09/175,056 by Gregory Michael Frees, filed on Oct. 20, 1998 and entitled "Method for Writing Servo Information on a Recording disk", assigned to the assignee of the present invention and incorporated herein by reference as background material.

This Application is related to U.S. patent application Ser. No. 09/426,435 by Timothy J. Chainer, Bucknell C. Webb, Mark D. Schultz, and Edward J. Yarmchuk, filed on Oct. 25, 1999 and entitled "Self-Servo-Writing Timing Pattern Generation with Non-Overlapping Read and Write Elements", assigned to the assignee of the present invention and incorporated herein by reference as background material.

TECHNICAL FIELD

Embodiments of the present invention relates to disk drives. More specifically, embodiments of the present invention relate to performing self-servo write in a helium environment.

BACKGROUND ART

The competition to sell disk drives at ever lower prices is intense. Manufacturers of disk drives are constantly developing new ways to cut the costs of manufacturing disk drives in order to sell their disk drives at competitive prices and to stay in business. FIG. 1 depicts a block diagram of a disk drive. Typically, data is read from and written to the recording disk 110 of a disk drive in circular tracks. Circular track positioning information 130 (CTPI) is typically written permanently to recording disks, such as recording disk 110, for example at the manufacturers, to facilitate reading data from and writing data to the recording disks 110. The CTPI 130 can include a pattern of radial positioning information A1, B1, A2. The radial positioning information A1, B1, A2 are commonly referred to as "servo bursts" and the pattern of the radial positioning information A1, B1, A2 is commonly referred to as a "servo pattern." The CTPI 130 is used during operation of the disk drive to ensure that the head of the disk drive is centered over the desired track of data 160, 170. For example, the CTPI 130 is used to determine where to write data to and where to read data from.

Typically a complete CTPI 130 includes radial positioning information A1, B1, A2 that are written on the recording disk 110 from the outer diameter 140 (OD) to the inner diameter 150 (ID). Although FIG. 1 depicts only a part of a CTPI 130, for the sake of simplification, the discussion herein shall refer to the CTPI 130 as if it were a complete CTPI 130.

The CTPI 130 is written to a recording disk 110 using a writing mechanism. For example, as the recording disk 110 spins around, the writing mechanism writes the CTPI 130 to the recording disk 110. The writing mechanism can include the write head of the disk drive, the suspension arm that the write head is attached to and what is commonly known as a "pusher" that mechanically pushes the suspension arm. The "pusher" mechanically pushes the suspension arm to position the write head to a desired location of the recording disk 110. In contrast the writing mechanism may not use a pusher. For example in this later case, the writing mechanism can include software that controls the suspension arm to position the write head over the desired location. The software programs can be executed on a general purpose computer or a special purpose microcontroller, among other things.

To avoid errors while reading or writing data, it is desirable that each track of data 160, 170 be as close to a perfect circle that is centered on the recording disk 110 as possible. Since the disk drive uses the CTPI 130 to determine where to write data to and/or to read data from, the placement of the CTPI 130 on the recording disk 110 directly affects the placement of the tracks of data 160, 170 on the recording disk 110.

FIG. 1 depicts ideal tracks of data 160, 170 that are perfect circles that are centered around the recording disk. However, in reality due to various factors that will be discussed, tracks of data 160, 170 are not perfect circles as is the case in the real world. In contrast, FIG. 2 is a block diagram of a disk drive depicting tracks of data 210, 220 that deviate from perfect circles. As the recording disk 110 spins, the air around the writing mechanism exerts force against the writing mechanism causing it to vibrate and causing the CTPI 130 to deviate more and more from a perfect circle. The faster the recording disk 110 spins, the greater the force that the air exerts on the writing mechanism and the more the CTPI 130 deviates from a perfect circle.

Deviation of a track of data 210, 220 from a perfect circle or off center 180 can cause a track of data 210, 220 to come close to an adjacent track of data 210, 220 resulting in a loss of data during a write process. For example, assume that tracks of data 210 and 220 are adjacent to each other on the recording disk 110 and data has already been written to track of data 210. At a particular point, while writing data to track of data 220, the data on track of data 210 may be overwrite when the data for track 220 is written at a particular point, referred to as a "squeeze point 230," where the two adjacent tracks of data 210, 220 are close together.

One method of reducing the imperfections of the CTPI 130 involves reducing the speed at which the recording disk 110 spins as the CTPI 130 is written to the recording disk 110. Typically, the CTPI 130 is written at half the speed that a disk drive is capable of spinning its recording disk 110. However, this greatly increases the length of time it takes to write the CTPI 130 to recording disks 110, thus, increasing the cost of manufacturing disk drives. A disk drive can spin as fast as the design of the disk drive allows it to spin at. This speed shall be referred to hereinafter as "Design revolutions per minute (RPM)."

For these and other reasons, a method that reduces the imperfections when writing circular track positioning information to a recording disk would be valuable.

DISCLOSURE OF THE INVENTION

Embodiments of the present invention pertain to methods of performing self-servo write using a helium environment. In one embodiment, a recording disk is placed in an enclosure. The enclosure is filled with a gas that is substantially helium. Self-servo write is used to write circular track positioning information on the recording disk.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Figure 3:
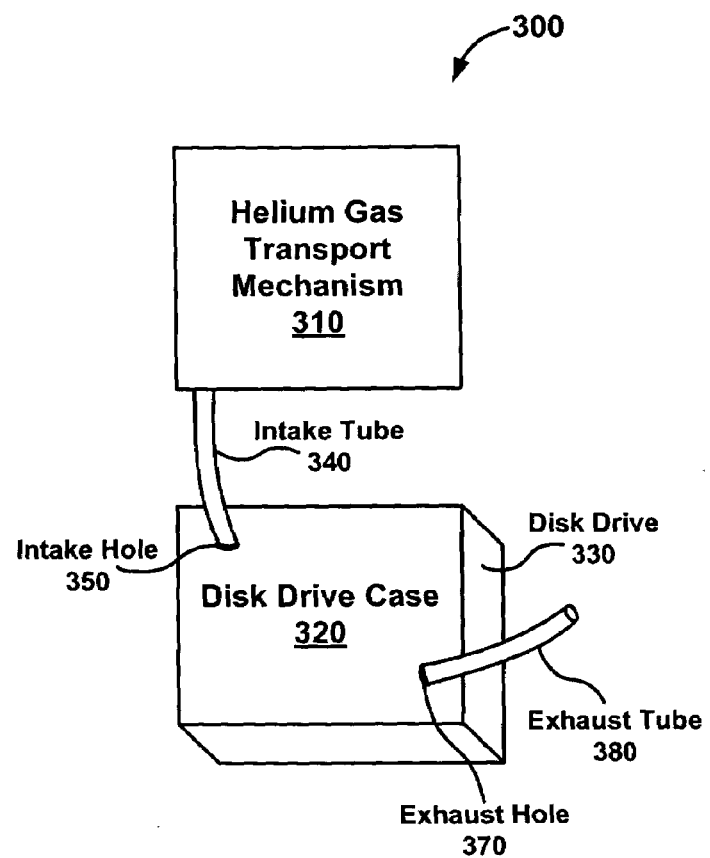
FIG. 3 is a block diagram of an apparatus for performing self-servo write in a helium environment, according to embodiments of the present invention.

Description of an Apparatus and a System for Performing Self-Servo Write in a Helium Environment FIG. 3 is a block diagram of an apparatus for performing self-servo write in a helium environment, according to embodiments of the present invention. The blocks in FIG. 3 can be arranged differently than as illustrated, and can implement additional or fewer features than what are described herein.

As depicted in FIG. 3, apparatus 300 includes a helium gas transport mechanism and an intake tube 340 that is configured to be coupled to a disk drive case 320, according to one embodiment. The disk drive case 320 encloses the recording disk. The disk drive 320 includes an intake hole 350 that is associated with the disk drive case 320, according to another embodiment. The apparatus 300 further includes an intake tube 340 that is configured to be coupled to the intake hole 350 associated with the disk drive case 320, according to yet another embodiment.

An exhaust hole 370 is associated with the disk drive case 320 for exhausting an air helium gas mix, according to still another embodiment. For example, initially the disk drive case 320 has air in it. As helium gas is delivered from the helium gas transport mechanism 310 to the interior of the disk drive case 320, the air in the disk drive case 320 is forced out of the exhaust hole 370 until the disk drive case 320 is filled with helium gas at a desired concentration (e.g., helium gas). An exhaust tube 380 is coupled with the exhaust hole 370, according to yet embodiment.

Once the disk drive case 320 is filled with helium gas at the desired concentration, self-servo write is performed on the recording disk, according to one embodiment. For a description of "self-servo write" refer to U.S. patent application Ser. No. 09/426,435, by Chainer et al., the contents of which are incorporated herein.

According to another embodiment, self-servo write can be performed while the helium is coming into the intake hole 350 and exhausting out the exhaust hole 370.

According to one embodiment, the intake hole 350 and/or exhaust hole 370 can be sealed with a partially confining substance to contain the helium in the disk drive case 320 during self-servo write. According to yet another embodiment, the partially helium confining substance is a metalized tape.

Since the density of helium is less than that of air, self-servo write can be performed on the recording disk up to the design RPMs that the disk drive 330 is capable of, according to yet another embodiment, while maintaining at least acceptable levels of quality. Writing the CTPI 130 to the recording disk (using self-servo write) at speeds up to the design RPMs greatly increases the level of productivity in manufacturing disk drives, such as disk drive 330.

The helium gas is pressurized, according to one embodiment, and the helium gas transport mechanism 310 is a tank of pressurized helium, according to yet another embodiment.

Conventional disk drive cases 320, typically have a particle count test comport for testing the contaminates contained in the disk drive case 320 and a breather filter for removing condensation and normalizing pressure. The intake hole 350 is a particular count test comport of the disk drive case 320, according to one embodiment, and the exhaust hole 370 is a breather filter of the disk drive case 320, according to yet another embodiment.

According to one embodiment, apparatus 300 uses the disk drive case 320 as the enclosure for containing the helium gas (e.g., providing a helium environment) while performing self-servo write. By using the disk drive case 320 the need for an expensive and possibly complicated apparatus for containing the helium gas is eliminated, according to one embodiment.

Although apparatus 300 is depicted using the disk drive case 320 as an enclosure, any apparatus that is capable of enclosing a recording disk for the purposes of providing a helium gas environment during self-servo write to a recording disk can be used as an enclosure instead of the disk drive case 320. In fact, the present invention is well suited to use with a conventional disk drive case. As a result, embodiments of the present invention operate efficiently with legacy disk drive cases. Hence, unlike CPTI writing mechanisms that require a pusher or previous solutions that provided a helium environment, no disassembly of the disk drive is required. Since no disassembly of the disk drive is required, the disk drive also does not need to be reassembled, thus, avoiding time consuming activities (e.g., disassembly and reassembly) that raise the cost of disk drives. Further, by using the disk drive case 320, the need for an expensive possibly complicated apparatus for containing helium gas is also eliminated, according to one embodiment.

Quality Issues

As already stated, a method, an apparatus, and/or a system that reduces the imperfections when writing CTPI 130 to a recording disk is valuable. By writing CTPI 130 to a recording disk in a helium environment, the CTPI 130 can be written at speeds up to the design RPMs that the disk drive 330 is capable of while maintaining at least acceptable levels of quality, according to one embodiment. An acceptable level of quality can involve eliminating squeeze points 230 so that there would not be a loss of data, according to another embodiment.

A CTPI writing mechanism can use previously written radial positioning information A1, B1, A2 (FIG. 2) to determine the location for writing subsequent radial positioning information A1, B1, A2 to a recording disk, according to one embodiment. For example, a writing mechanism can refer to radial positioning information A1, for example, when determining where to write radial positioning information B 1 and can refer to radial positioning information B1 when determining where to write radial positioning information A2 until a complete CTPI 130 has been written to the recording disk from OD to ID 150. The vibrations of the writing mechanism can cause radial positioning information A1, B1, A2 to be slightly misplaced. Since the writing mechanism relies on the positioning of previously written radial positioning information, such as A1, when determining where to write subsequent radial positioning information, such as B1, the position of the radial positioning information A1, B1, A2 can deviate more and more from desired positions as the radial positioning information A1, B1, A2 are written from OD to ID 150.

For example, radial positioning information A1 can deviate slightly from the desired position due to vibrations of the writing mechanism. Since the position of radial positioning information B1 relies on the position of A1, radial positioning information B1 can deviate even more from the desired position. This increase in deviation of radial positioning information A1, B1, A2 from desired positions is commonly referred to as non-repeatable runout (NRRO). By writing CTPI 130 to a recording disk in a helium environment, the CTPI 130 can be written at speeds up to the design RPMs that the disk drive 330 is capable of while maintaining the amount of NRRO within acceptable levels of quality, according to one embodiment.

Today, the number of tracks of data 210, 220 written to a recording disk is approaching 150,000 per linear inch. Approximately 4–5 years ago, the number of tracks of data 210, 220 written to a recording disk was approximately 20,000 per linear inch. As more and more tracks of data 210, 220 per linear inch are written to recording disks, the placement of the CTPI 130 is becoming more and more critical. Therefore, by providing a helium environment while performing self-servo write. The present embodiment allows manufacturing to write a CTPI 130 to a recording disk at speeds up to the design RPMs of the disk drive 330.

Figure 4:
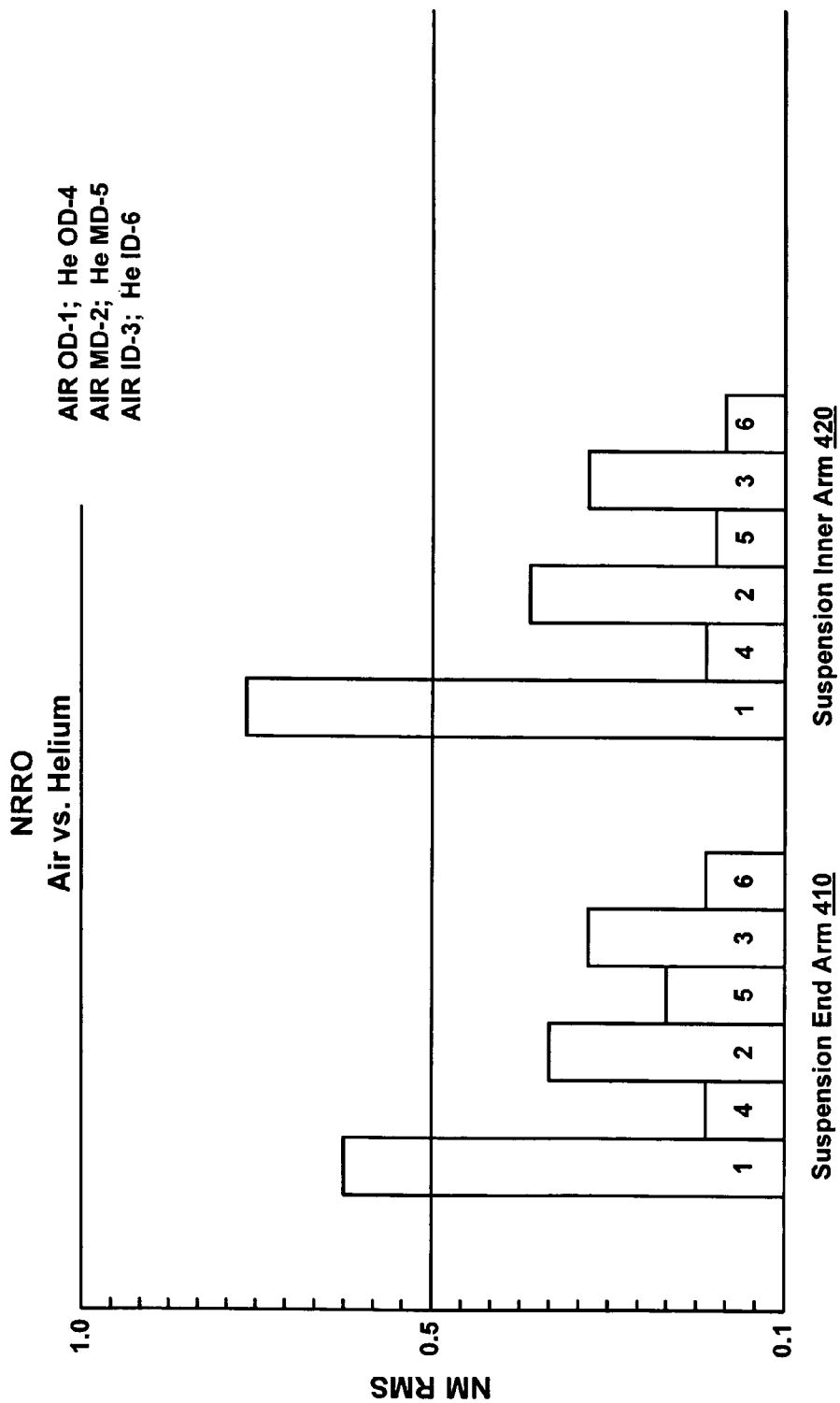
FIG. 4 is a graph contrasting the amount of NRRO while performing self-servo write using an air environment verses a helium environment, according to one embodiment.

FIG. 4 is a graph contrasting the amount of NRRO while performing self-servo write using an air environment verses a helium environment, according to one embodiment. For example, the vertical axis depicts various measurements that were taken for the suspension end arm 410 and the suspension inner arm 420 for a disk drive, such as disk drive 330. A write head is attached to a suspension arm. The vertical axis depicts Nanometer (NM) Root Mean Square (RMS). The measurements were taken for the ID 150, the middle of the recording disk (MD), and the OD 140 for both air (Air OD-1, Air MD-2, Air ID-3) and helium (He OD-3, He MD-4, He ID-5). As can be seen, the amount of NM RMS is greatly reduced for all measurements depicted in FIG. 4 when using a helium environment.

OPERATIONAL EXAMPLE OF A METHOD FOR PERFORMING SELF-SERVO WRITE IN A HELIUM ENVIRONMENT

Figure 5:
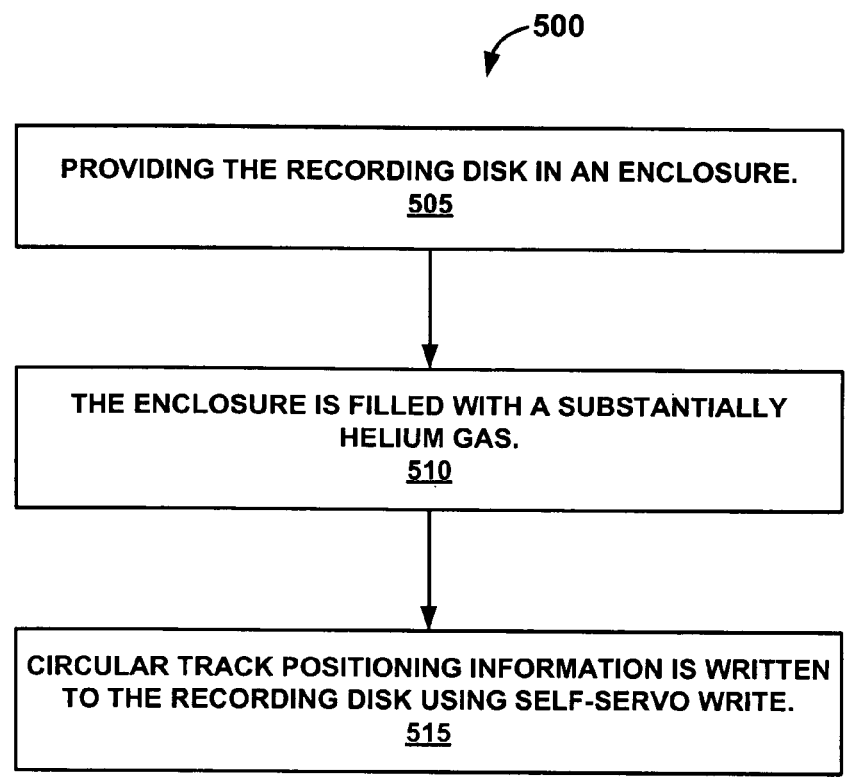
FIG. 5 depicts flowchart 500 for performing self-servo write in a helium environment, according to embodiments of the present invention.

FIG. 5 depicts flowchart 500 for performing self-servo write in a helium environment, according to embodiments of the present invention. Although specific steps are disclosed in flowchart 500, such steps are exemplary. That is, embodiments of the present invention are well suited to performing various other steps or variations of the steps recited in flowchart 500. It is appreciated that the steps in flowchart 500 may be performed in an order different than presented, and that not all of the steps in flowchart 500 may be performed. All of, or a portion of, the embodiments described by flowchart 500 can be implemented using computer-readable and computer-executable instructions which reside, for example, in computer-usable media of a computer system or like device.

Figure 1:
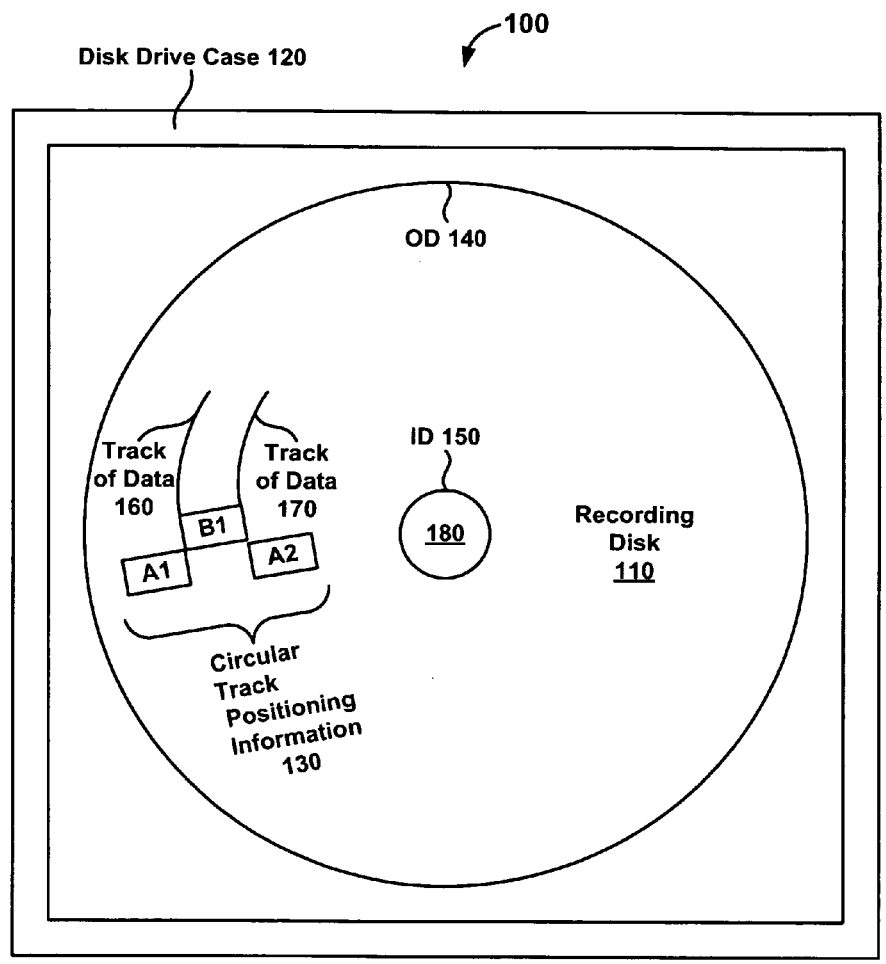
FIG. 1 depicts a block diagram of a disk drive.
Figure 2:
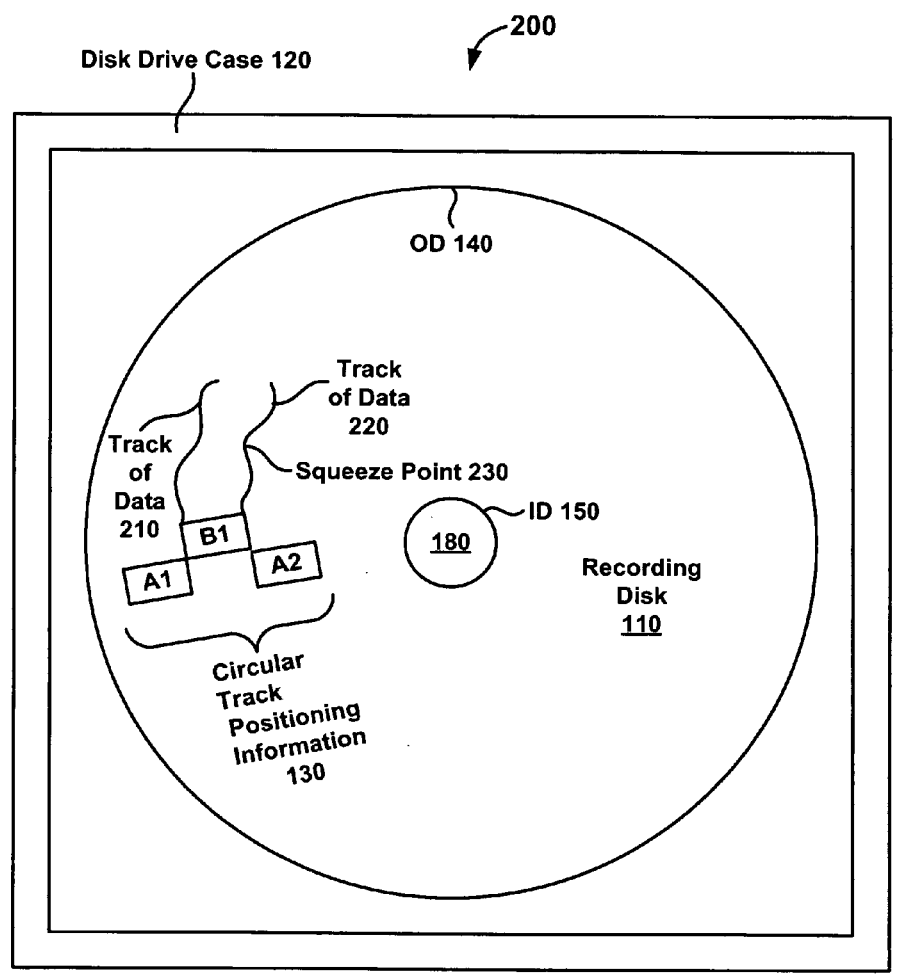
FIG. 2 is a block diagram of a disk drive depicting tracks of data that deviate from perfect circles.

For the purposes of illustration, the discussion of flowchart 500 shall refer to the structures depicted in FIGS. 1, 2, and 3.

In step 505, providing recording disk in an enclosure, according to one embodiment. For example, this enclosure can be the disk drive case 320 that a recording disk is shipped with or this enclosure can be any apparatus that is capable of enclosing a recording disk for the purposes of providing a helium gas environment during servo write to a recording disk. For the purposes of illustration, it shall be assumed that the enclosure is a disk drive case 320 for a disk drive 330.

In step 510, the enclosure is filled with a helium gas, according to another embodiment. For example, a helium gas transport mechanism 310 (FIG. 3) delivers pressurized helium gas to a disk drive case 320 (FIG. 3) for a disk drive 330 (FIG. 3). As the pressurized helium gas mix is delivered, the air that was initially in the disk drive case 320 is forced out. Eventually helium gas fills the disk drive case 320. The particular count test comport is used to receive the helium gas, according to one embodiment, and the air that was initially in the disk drive case 320 is forced out the breather filter of the disk drive case 320, according to another embodiment.

The disk drive is powered on to assist in filling the enclosure with helium gas, according to one embodiment. For example, the helium gas can be delivered to the disk drive 330 after the disk drive 330 is powered on.

The intake and exhaust holes 350, 370 are sealed with an at least partially helium confining substance, according to one embodiment. The substance is a metalized tape, according to another embodiment. After self-servo write has been performed, the substance can be removed, according to another embodiment According to another embodiment, the circular track positioning information is written to the recording disk while the helium gas is being introduced into the intake hole. IN this case, the intake and exhaust holes 350, 370 do not need to be sealed.

In step 515, circular track positioning information is written to the recording disk using self-servo write, according to yet another embodiment. For example, a computer with software may be used to direct the write head of the disk drive 330 (FIG. 3) to perform self-servo write on the recording disk enclosed in the disk drive case 320 (FIG. 3). The self-servo write is performed at seeds up to the design RPM, according to one embodiment.

What is claimed is:

1. A method of performing self-servo write on a recording disk, the method comprising:
providing the recording disk in an enclosure, wherein the enclosure is a disk drive case;
introducing helium gas into the enclosure;
writing the circular track positioning information on the recording disk using self-servo write such that the self-servo write is performed without requiring disassembly of the enclosure and without requiring an additional enclosure; and sealing an exhaust hole and an intake hole that are associated with the enclosure with a substance that is at least partially helium confining after helium gas has been introduced into the enclosure, wherein the substance is a metal ized tape.

2. The method as recited in claim 1, wherein the providing the recording disk in the enclosure further comprises:
providing the recording disk in a disk drive case used to house the recording disk.

3. The method as recited in claim 1, wherein the introducing the helium gas into the enclosure further comprises:
introducing the helium gas into an intake hole associated with the enclosure while exhausting gas through an exhaust hole associated with the enclosure.

4. The method as recited in claim 3, wherein the introducing the helium gas into the enclosure further comprises:
introducing the helium gas into a particle count test comport associated with the enclosure while exhausting gas through a breather filter associated with the enclosure.

5. The method as recited in claim 1 wherein the introducing the helium gas into the enclosure further comprises:
introducing helium gas that is pressurized into the enclosure.

6. The method as recited in claim 1 wherein the writing the circular track positioning information on the recording disk using self-servo write further comprises:
writing the circular track positioning information at speeds up to design revolutions per minutes.

7. A method of performing self-servo write in a helium environment without requiring disassembly of a convention disk drive case, the method comprising:
providing the recording disk in an enclosure, wherein the enclosure is a disk drive case;
introducing helium gas into the enclosure;
writing the circular track positioning information on the recording disk using self-servo write such that the self-servo write is performed without requiring disassembly of the enclosure and without requiring an additional enclosure; and
sealing an exhaust hole and an intake hole that are associated with the enclosure with a substance that is at least partially helium confining after helium gas has been introduced into the enclosure, wherein the substance is a metalized tape.

8. The method as recited in claim 7, wherein the providing the recording disk in the enclosure further comprises:
providing the recording disk in a disk drive case used to house the recording disk.

9. The method as recited in claim 7, wherein the introducing the helium gas into the enclosure further comprises:
introducing the helium gas into an intake hole associated with the enclosure while exhausting gas through an exhaust hole associated with the enclosure.

10. The method as recited in claim 9, wherein the introducing the helium gas into the enclosure further comprises:
introducing the helium gas into a particle count test comport associated with the enclosure while exhausting gas through a breather filter associated with the enclosure.

11. The method as recited in claim 7 wherein the introducing the helium gas into the enclosure further comprises:
introducing helium gas that is pressurized into the enclosure.

12. The method as recited in claim 7 wherein the writing the circular track positioning information on the recording disk using self-servo write further comprises:
writing the circular track positioning information at speeds up to design revolutions per minute.

13. A method of performing self-servo write on a recording disk such that non-repeatable runout errors are reduced during self-servo write, the method comprising:
providing the recording disk in an enclosure, wherein the enclosure is a disk drive case;
introducing helium gas into the enclosure;
writing the circular track positioning information on the recording disk using self-servo write such that the self-servo write is performed such that non-repeatable runout errors are reduced during self-servo write, wherein an additional enclosure is not required; and
sealing an exhaust hole and an intake hole that are associated with the enclosure with a substance that is at least partially helium confining after helium gas has been introduced into the enclosure, wherein the substance is a metalized tape.

14. The method as recited in claim 13, wherein the providing the recording disk in the enclosure further comprises:
providing the recording disk in a disk drive case used to house the recording disk.

15. The method as recited in claim 13, wherein the introducing the helium gas into the enclosure further comprises:
introducing the helium gas into an intake hole associated with the enclosure while exhausting gas through an exhaust hole associated with the enclosure.

16. The method as recited in claim 15, wherein the introducing the helium gas into the enclosure further comprises:
introducing the helium gas into a particle count test comport associated with the enclosure while exhausting gas through a breather filter associated with the enclosure.

17. The method as recited in claim 13 wherein the introducing the helium gas into the enclosure further comprises:
introducing helium gas that is pressurized into the enclosure.

18. The method as recited in claim 13 wherein the writing the circular track positioning information on the recording disk using self-servo write further comprises:
writing the circular track positioning information at speeds up to design revolutions per minute.

* * * * *